United States Patent [19]

Balasubramaniam

[11] Patent Number: 5,586,150
[45] Date of Patent: Dec. 17, 1996

[54] METHOD AND APPARATUS FOR SYMBOL SYNCHRONIZATION IN MULTI-LEVEL DIGITAL FM RADIO

[75] Inventor: Rajupandaram K. Balasubramaniam, 2420 NW. Rolling Green Dr. #30, Corvallis, Oreg. 97330

[73] Assignee: Rajupandaram K. Balasubramaniam, Corvallis, Oreg.

[21] Appl. No.: 157,996

[22] Filed: Nov. 24, 1993

[51] Int. Cl.⁶ .............................. H04L 7/00; H04L 7/02; H04L 25/49
[52] U.S. Cl. ......................... 375/354; 375/357; 375/359; 375/293
[58] Field of Search ........................... 375/106, 107, 375/17, 20, 354, 357, 359, 286, 287, 293; 370/100.1, 105.1, 105.2

[56] References Cited

U.S. PATENT DOCUMENTS

| | | |
|---|---|---|
| 3,702,008 | 10/1972 | Groth . |
| 4,028,497 | 6/1977 | Saburi . |
| 4,054,863 | 10/1977 | Goodman et al. . |
| 4,100,499 | 7/1978 | Monrolin . |
| 4,117,267 | 9/1978 | Haberle et al. . |
| 4,161,786 | 7/1979 | Hopkins et al. . |
| 4,204,093 | 5/1980 | Yeh .......................................... 370/95.1 |
| 4,251,865 | 2/1981 | Moore et al. . |
| 4,312,075 | 1/1982 | Murano et al. .......................... 375/106 |
| 4,322,845 | 3/1982 | Fennel, Jr. et al. ..................... 370/104 |
| 4,352,183 | 9/1982 | Davis et al. . |
| 4,357,700 | 11/1982 | Alvarez, III et al. . |
| 4,414,661 | 11/1983 | Karlstrom ............................. 370/100.1 |
| 4,491,947 | 1/1985 | Frank ..................................... 370/94.1 |
| 4,527,279 | 7/1985 | Yasuda et al. .......................... 375/114 |
| 4,538,147 | 8/1985 | Grow ................................. 340/825.05 |
| 4,538,261 | 8/1985 | Kume . |
| 4,564,838 | 1/1986 | Boulogne et al. . |
| 4,573,207 | 2/1986 | Smith et al. .............................. 455/54 |
| 4,578,800 | 3/1986 | Yasuda et al. .......................... 375/106 |

(List continued on next page.)

FOREIGN PATENT DOCUMENTS 1566305  4/1980  United Kingdom .

OTHER PUBLICATIONS

Goodman, D. & Wei, S. "Factors Affecting the Bandwidth Efficiency of Packet Reservation Multiple Access," *Proceedings* of the 1989 IEEE Vehicular Tech. Conf., pp. 292–299.

Jalloul, L., Nanda, S., & Goodman, D. "Packet Reservation Mulitple Access over Slow and Fast Fading Channels," IEEE, 1990, pp. 354–359.

Eizenhofer, A. & von Harten, G. "BCMA: Backlog Controlled Multiple Access," *Proceedings* of 1988 IEEE Vehicular Tech. Conf. pp. 285–290.

Goodman, D., Valenzuela, R. Gayliard, K. & Ramamurthi, B. "Packet Reservation Multiple Access for Local Wireless Communications", *Proceedings* of 1988 IEEE Vehicular Tech. Conf., pp. 701–706.

Sollenberger, N. R.; Chuang, Justin C–I, *IEEE* 19, "Low Overhead Symbol Timing and Carrier Recovery for TDMA Portable Radio Systems", pp.; pre-publication copy obtained May, 1990.

(List continued on next page.)

*Primary Examiner*—Stephen Chin
*Assistant Examiner*—Hai H. Phan

[57] ABSTRACT

A block demodulation method and apparatus that provides for synchronizing bursts of incoming data without a special symbol synchronization word, and minimal frame synchronization overhead. An entire burst, comprising ramp up time, a preamble, guard times, data and ramp down time, is captured and stored in the form of baseband samples of the signal burst. The burst samples are then filtered to reduce pattern jitter. Thereafter, the samples are squared to derive the symbol clock. Then, the samples are differenced and cyclically accumulated. The cyclicly accumulated samples are examined to find a valid zero crossing. In the event that the aforementioned method does not identify a valid zero crossing, two additional methods for finding a valid zero crossing are employed.

22 Claims, 5 Drawing Sheets

U.S. PATENT DOCUMENTS

| | | | |
|---|---|---|---|
| 4,583,217 | 4/1986 | Kittel . | |
| 4,612,637 | 9/1986 | Davis et al. | 370/95.1 |
| 4,641,304 | 2/1987 | Raychaudhuri | 370/95.1 |
| 4,651,026 | 3/1987 | Serfaty et al. | 307/269 |
| 4,672,606 | 6/1987 | Bourgonje et al. . | |
| 4,683,531 | 7/1987 | Kelch et al. . | |
| 4,688,210 | 8/1987 | Eizenhöfer et al. | 375/107 |
| 4,712,229 | 12/1987 | Nakamura | 379/58 |
| 4,736,371 | 4/1988 | Tejima et al. . | |
| 4,742,512 | 5/1988 | Akashi et al. | 370/104 |
| 4,745,600 | 5/1988 | Herman et al. | 370/95.1 |
| 4,754,453 | 6/1988 | Eizenhöfer | 370/95.1 |
| 4,756,007 | 7/1988 | Qureshi et al. | 375/8 |
| 4,763,322 | 8/1988 | Eizenhöfer | 370/110.1 |
| 4,774,707 | 9/1988 | Raychaudhuri | 370/95.1 |
| 4,775,974 | 10/1988 | Kobayashi | 370/104 |
| 4,782,484 | 11/1988 | Limb | 370/100 |
| 4,799,252 | 1/1989 | Eizenhöffer | 379/59 |
| 4,803,681 | 2/1989 | Takahashi | 370/85 |
| 4,807,257 | 2/1989 | Schouhamer Immink et al. | 375/106 |
| 4,815,073 | 3/1989 | Grauel et al. | 370/95.1 |
| 4,817,089 | 3/1989 | Paneth et al. | 370/109 |
| 4,849,991 | 7/1989 | Arnold et al. | 375/106 |
| 4,850,033 | 7/1989 | Eizenhöfer | 455/56 |
| 4,887,266 | 12/1989 | Neve et al. | 370/95.1 |
| 4,888,765 | 12/1989 | Dyke | 370/95.1 |
| 4,890,299 | 12/1989 | Dolivo et al. | 375/18 |
| 4,896,334 | 1/1990 | Sayar | 375/20 |
| 4,907,224 | 3/1990 | Scoles et al. | 370/85.2 |
| 4,937,818 | 6/1990 | Sonetaka | 370/95.3 |
| 4,940,974 | 7/1990 | Sojka | 370/95.2 |
| 4,941,155 | 7/1990 | Chuang et al. | 375/106 |
| 4,949,395 | 8/1990 | Rydbeck | 455/33 |
| 4,953,185 | 8/1990 | Goode | 375/106 |
| 4,984,255 | 1/1991 | Davis et al. | 375/106 |
| 4,987,571 | 1/1991 | Haymond et al. | 370/85.3 |
| 5,003,534 | 3/1991 | Gerhardt et al. | 370/94.1 |
| 5,008,883 | 4/1991 | Eizenhöfer et al. | 370/95.1 |
| 5,012,469 | 4/1991 | Sardana | 370/95.3 |
| 5,070,536 | 12/1991 | Mahany et al. | 455/67.1 |
| 5,072,445 | 12/1991 | Nawata | 375/109 |
| 5,081,622 | 1/1992 | Nassehi et al. | 370/85.2 |
| 5,084,891 | 1/1992 | Ariyavisitakul et al. | 371/42 |
| 5,103,445 | 4/1992 | Östlund | 370/79 |
| 5,121,387 | 6/1992 | Gerhardt et al. | 370/85.2 |
| 5,166,929 | 11/1992 | Lo . | |
| 5,172,375 | 12/1992 | Kou | 370/95.3 |
| 5,199,031 | 3/1993 | Dahlin | 370/110.1 |

OTHER PUBLICATIONS

Furuya, Y.; Akashi, F.; Murakaumi, S., *IEEE* 1983, "A Practical Approach Toward Maximum Likelihood Sequence Estimation for Band–Limited Nonlinear Channels", pp. 200–207.

Dechambre, M. & Levy, A. J., "Limits of Data Rates in the Urban Mobile Channel", *Proceedings* of 1987 IEEE Vehicular Tech. Conf., pp. 541–546.

Feher, K. "MODEMS for Emerging Digital Cellular–Mobile Radio System", IEEE *Transactions on Vehicular Technology*, vol. 40, No. 2, May 1991, pp. 355–365.

Akaiwa, Y., Takase, I., Kojima, S., Ikoma, M., & Saegusa, N. "Performance of Baseband–Bandlimited Multilevel FM with Discriminator for Digital Mobile Telephony", *Translations* of IECE o Japan, vol. E64, No. 7, Jul. 1987, pp. 463–469.

Kleinrock, L. & Tobagi, F. "Random Access Techniques for Data Transmission Over Packet–Switched Radio Channels", *Proceedings* of 1975 National Computer Conf., pp. 187–201.

Rosner, R. D., *Packet Switching: Tomorrow's Communications Today*, Belmont, CA 1982, Chapters 13–15.

Lee, W. C. Y., *Mobile Communications Design Fundamentals*, New York, NY 1993, pp. 1–44, 169–173.

Schoute, F. C., "Dynamic Frane Length ALOHA" *ieee Trans. Comm.* vol. Com. –31, No. 4, pp. 565–568, 1983.

Onozato, Y. & Kato, T. "Stability Analysis of Combined Random/Reservation Access Methods", *Electronics and Communications in Japan,* Part 1, vol. 72, No. 4, 1989, pp. 10–17.

Benelli, G. "Some New Retransmission Strategies for Multipacket Slotted ALOHA Protocol", IEEE *Proceedings,* vol. 135, Pt. F, No. 6, Dec. 1988, pp. 585–593.

Wong, E. & Yum, T. "The Controlled–SRMA Protocol for Packet Satellite Communication", *Record* of the 1988 IEEE International Conference on Communications, vol. 2, pp. 812–818.

Davie, M. & Smith, J. "A Cellular Packet Radio Data Network", *Electronics & Communication Engineering Journal,* vol. 3, No. 3, Jun. 1991, pp. 137–143.

RAM Mobile Data, Inc., "An Overview of The RAM Mobile Data, Inc. Mobitex Packet Radio Networks", Aug., 1990, pp. 21–23, 27, 28, 31–34, 51–52.

Motorola European Research Laboary, "Mobile Digital Trunked Radio System", Feb., 1991, pp. 1–7.

Bustillo, et al. "Datamobile: A Practical Implementation of TRADAMO Mobile Data Transmission Protocol", Proceedings of the 1989 IEEE Vehicular Tech. Conf., pp. 35–37.

II Morrow/United Parcel Service, "Technical Presentation," FCC PR Docket No. 89–552, Dec., 1990, pp. 1–25.

Fielding et al., "Comments of United Parcel Service, Inc.," Mar. 1990, FCC PR Docket No. 89–552, RM–6595, pp. 1–50, 1–33.

Federal Communications Commission, "Notice of Proposed Rule–making," P.R. Docket 89–552 RM–6595, Dec. 1989, pp. 1–20.

Federal Communications Commission, "Report and Order," P.R. Docket No. 89–552, RM–6595, pp. 1–35.

MPT 1327, "A Signalling Standard for Trunked Private Land Mobile Radio Systems," Jan., 1988, pp. cover page, 1–8, 1–13, 6–7, 7–1 through 7–10, 14–1 through 14–10, 15–1 through 15–3, 17–1 through 17–56, A7–1, A7–2.

United Parcel Service, "Technical Reply Comments of United Parcel Service, Inc.," FCC PR Docket No. 89–552, Apr. 1990, pp. 1–28, 1–5.

James K. Cavers, "The Performance of Phase Locked Transparent Tone–in–Band with Symmetric Phase Detection", IEEE Transactions on Communications, vol. 39, No. 9, Sep. 1991, pp. 1389–1399.

James K. Cavers, "Phase Locked Transparent Tone–in–Band: An Analysis", Proceedings IEEE Vehicular Technology Conference 1989, pp. 73–77.

Shigeru Ono, Noriaki Kondoh, and Yoshihito Shimazaki, "Digital Cellular System With Linear Modulation", Proceedings IEEE Vehicular Technology Conference 1989, pp. 44–49.

METHOD AND APPARATUS FOR SYMBOL SYNCHRONIZATION IN MULTI-LEVEL DIGITAL FM RADIO

BACKGROUND OF THE INVENTION

This invention relates to packet data radio communication systems, and particularly to such systems where there is a need at a radio receiver to receive incoming relatively short bursts of data.

In a land mobile data communication system there typically will be a number of base stations at fixed locations covering predetermined geographic areas and a much larger number of mobile stations in vehicles that travel within and between those geographic areas. Where packet data communication or digital control signalling is used, base stations will, in effect, broadcast to the mobile stations, and the mobile stations will transmit signals to the base stations in bursts, as required by the circumstances. When signal burst duration is minimized to maximize radio channel capacity, each signal burst tends to require controlled amplitude envelope rise and fall times, or "ramp up" and "ramp down" time, and typically contains various control symbols as well as information data packets.

Ordinarily, synchronization for each such burst must be performed using only the waveform of the individual burst. Thence, each such burst conventionally includes a preamble having a symbol timing synchronization word ("STSW"), and a frame timing synchronization word ("FTSW") for modulation symbol detection and data block or frame synchronization. However, this approach requires many preamble symbols which, by consuming channel time that could be used for transmitting information, i.e., the preamble symbols are "overhead" which reduces channel efficiency, especially in bursty communications.

Therefore, there is a need for a method and apparatus for synchronizing bursts of incoming data that does not require high overhead and, thereby, provides greater channel efficiency, and wherein symbol synchronization is derived from the information symbols rather than from the use of a special preamble.

SUMMARY OF THE INVENTION

The present invention overcomes the aforementioned problem and meets the aforementioned need by providing a block demodulation method and apparatus that provides for synchronizing bursts of incoming data without a special symbol synchronization word, and minimal frame synchronization overhead. An entire burst, comprising ramp up time, a preamble, guard times, data and ramp down time, is captured and stored in the form of baseband samples of the signal burst. The burst samples are then filtered to reduce pattern jitter. Thereafter, the samples are squared to derive the symbol clock. Then, the samples are differenced and cyclically accumulated. The cyclicly accumulated samples are examined to find a valid zero crossing.

In the event that the aforementioned method does not identify a valid zero crossing, a second method is employed. In the second method, a histogram is constructed whereby the number of times a sample of a baseband data symbol falls within any one of a predetermined number of bins associated with an equivalent number of pulse amplitude modulation ("PAM") levels is found for each of the sample points. The sample point having the maximum such number is used as the symbol timing reference.

In the event that the aforementioned second method does not provide a histogram value greater than a predetermined threshold, a third method is employed. The third method is similar to the second method, except that a predetermined odd number of baseband levels, greater than the actual number of PAM levels is employed. The samples are used to construct a second set of burst samples which are obtained as a difference of the original samples, spaced one symbol apart. The histogram method is again employed using bins in number equalling the predetermined, odd number of levels of the second set of samples.

Therefore, it is a principal object of the present invention to provide a novel and improved method and apparatus for symbol synchronizing bursts of digital signaling or data.

It is another object of the present invention to provide such a method and apparatus wherein minimal overhead is required so as to maximize channel efficiency.

The foregoing and other objects, features, and advantages of the invention will be more readily understood upon consideration of the following detailed description of the invention, taken in conjunction with the accompanying drawings.

DETAILED DESCRIPTION OF THE INVENTION

Figure 1:
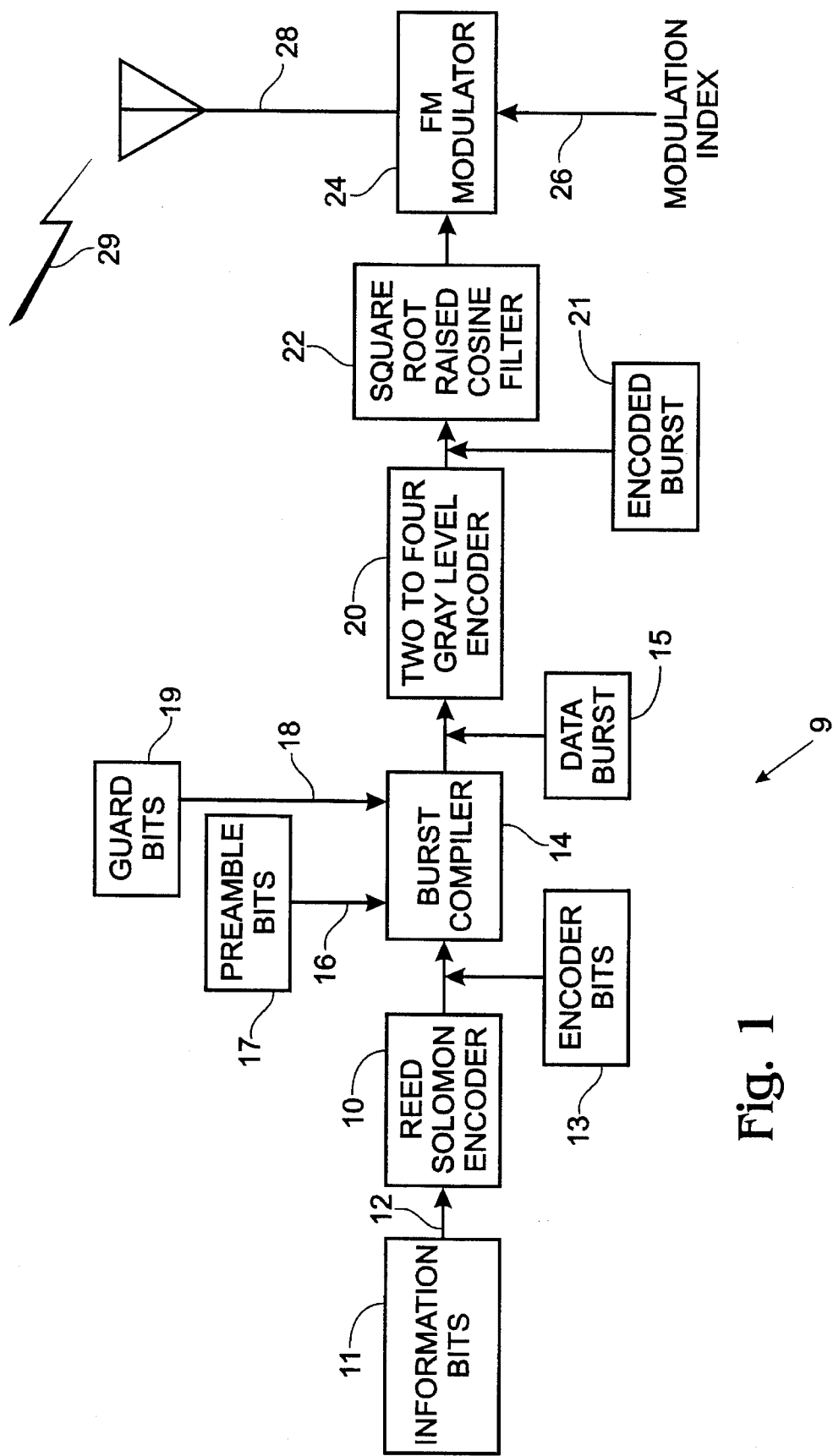
FIG. 1 is a block diagram of a radio transmitter which produces a radio signal having data bursts, according to the present invention.

A signal according to the present invention may be produced by a radio transmitter 9 of the type shown in FIG. 1. Information bits 11, comprising user data, are provided at input 12. The bits 11 are encoded to form encoded bits 13, preferably by a Reed-Solomon encoder 10, as is commonly understood in the art. A data burst 15 is then formed by a burst compiler 14. The data burst 15 comprises the encoded bits 13, as well as predetermined preamble bits 17 and guard bits 19. The values of the preamble bits 17 preferably are system configurable. The preamble bits 17 and the guard bits 19 are provided at inputs 16 and 18, respectively. The preamble bits 17 are used to provide frame synchronization information, as the use of multi-level FM modulation eliminates need for carrier phase synchronization and the present invention eliminates the need to use a special preamble for symbol timing synchronization.

The data burst 15 as formed by burst compiler 14 is applied to a Gray level encoder 20 for encoding the bits into a predetermined number of levels. Although two-to-four level encoding is shown, it is to be recognized that the data burst 15 may be encoded using other numbers of levels without departing from the principles of the invention. An encoded burst 21 is output from the encoder 20 and is applied to a square root raised cosine filter 22 to shape the energy spectrum of the encoded burst 21. It is to be recognized that although a square root raised cosine filter is shown, other filters may be used without departing from the principles of the invention.

The output of the filter 22 is applied to an FM modulator 24, having a modulation index input 26. The FM modulator 24 modulates a carrier signal so as to provide a transmitted modulation burst which, using an antenna 28, is transmitted over a channel 29.

Figure 2:
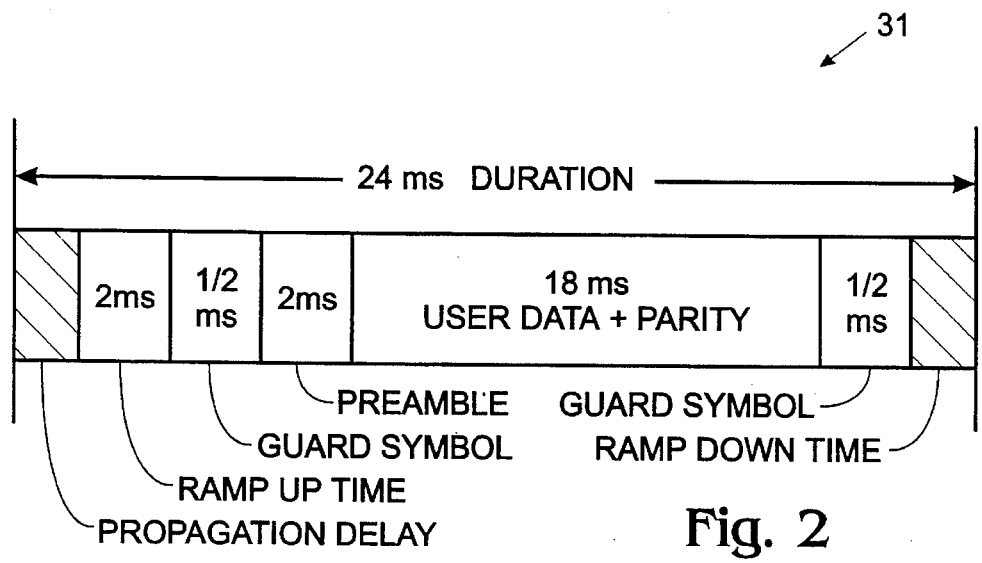
FIG. 2 is a diagram of a data burst, according to the present invention.

A signal comprising a transmitted modulation burst 31, as received by the receiver, is shown in FIG. 2. The channel 29 is divided into slots of predetermined duration, e.g., a duration of 24 milliseconds. Each transmitted modulation burst 31 has a predetermined, effective duration shorter than the duration of a corresponding slot and falls within the duration of that slot. In one embodiment, each transmitted modulation burst 31 comprises predetermined components, including a leading half-millisecond guard symbol, a 2 milliseconds preamble, 18 milliseconds of user data plus parity bits, and a trailing half-millisecond guard symbol. The difference in time between the slot's duration and the duration of the above-described components accommodates propagation delay over the channel 29, as well as the ramp-up/down of the mobile power amplifier. Although a transmitted modulation burst 31 may be configured as shown, it is to be recognized that the burst 31 may have other configurations without departing from the principles of the invention.

Figure 3:
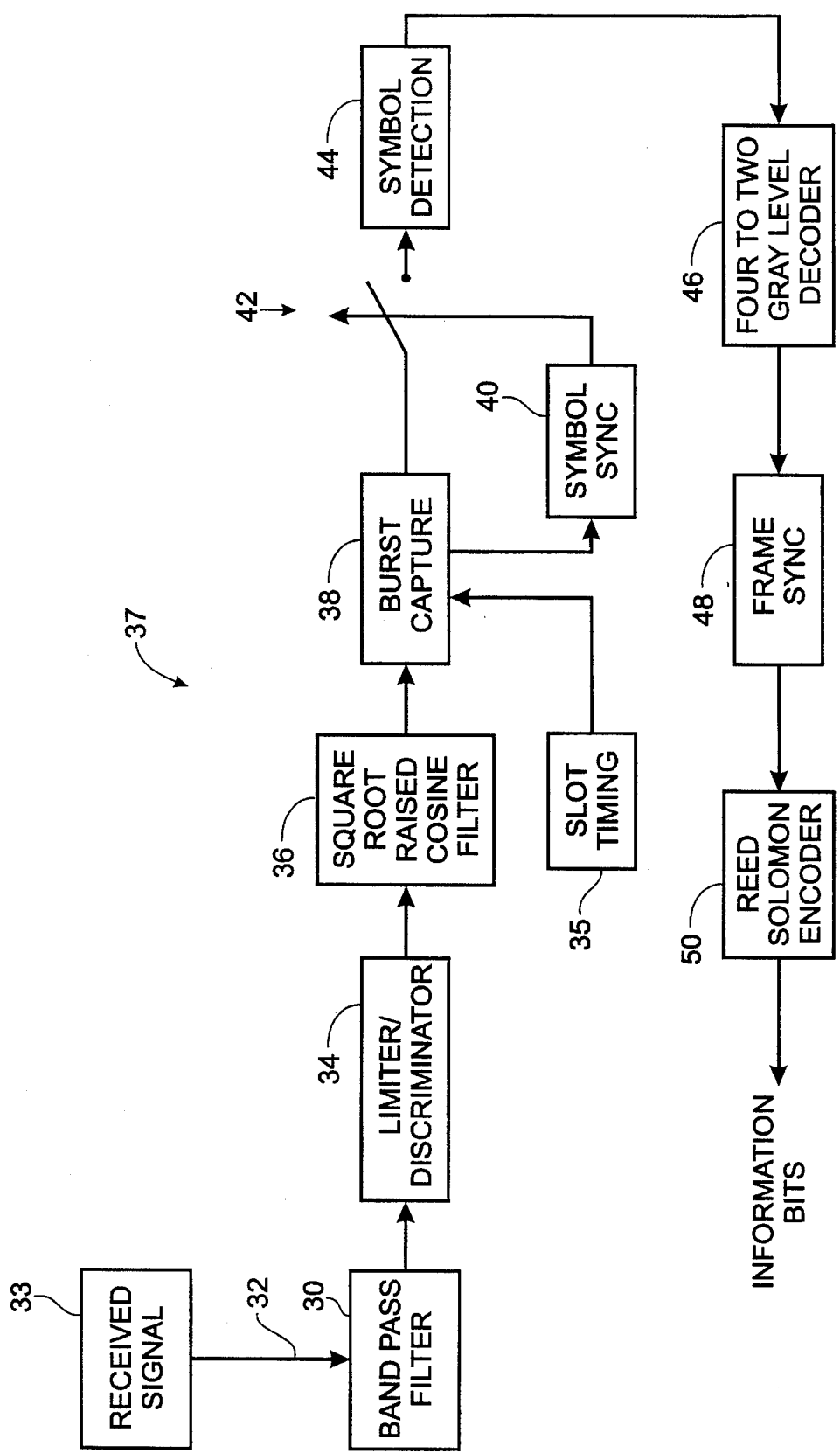
FIG. 3 is a block diagram of a radio receiver which employs a method and apparatus for synchronizing bursts of incoming data, according to the present invention.

A suitable receiver 37 for receiving signals 33 comprising one or more transmitted modulation bursts 31 and for employing the invention is shown in FIG. 3. It comprises a band pass filter 30, having an input 32 for inputting the received signal 33. The output of the band pass filter 30 is applied to a limiter/discriminator circuit 34 which converts the FM modulated burst into a PAM baseband pulse train of symbols, each symbol having a predetermined number of levels as described above. The circuit 34 also provides for sampling the baseband pulse train at a predetermined rate so as to produce M samples per modulation symbol. The samples are applied to a filter 36 of a type corresponding to that used in the radio transmitter 9 described above.

An encoded burst, corresponding to an encoded burst 21 of the radio transmitter 9 described above, is captured from the output of the filter 36 by a burst capture function 38. The output of the burst capture function is applied both to a symbol synchronization function 40 and, through a gate 42, to a symbol detection function 44. The burst capture function 38 uses a slot timing signal 35 provided by the receiver's associated transmitter, that transmitter preferably transmitting continuously.

The symbol detection function 44 maps each symbol to one of a predetermined number of PAM levels that, in number, correspond to the number of levels employed by the transmitter 9. Once the symbols are detected, they are applied to a Gray level decoder 46 for decoding from the predetermined number of levels into two levels, i.e., into bits. The output of the decoder 46 comprises data bursts corresponding to data bursts 15 of the transmitter 9. The frame synchronizer 48 identifies the frame synchronization bits obtained from the output of the decoder 46. The encoded bits 13 are provided to a decoder so as to be decoded into information bits 11. The type of decoder used by the receiver 37 preferably corresponds to the encoder 20 of the transmitter 9, e.g., a Reed-Solomon decoder 50 as is commonly understood in the art.

Figure 4:
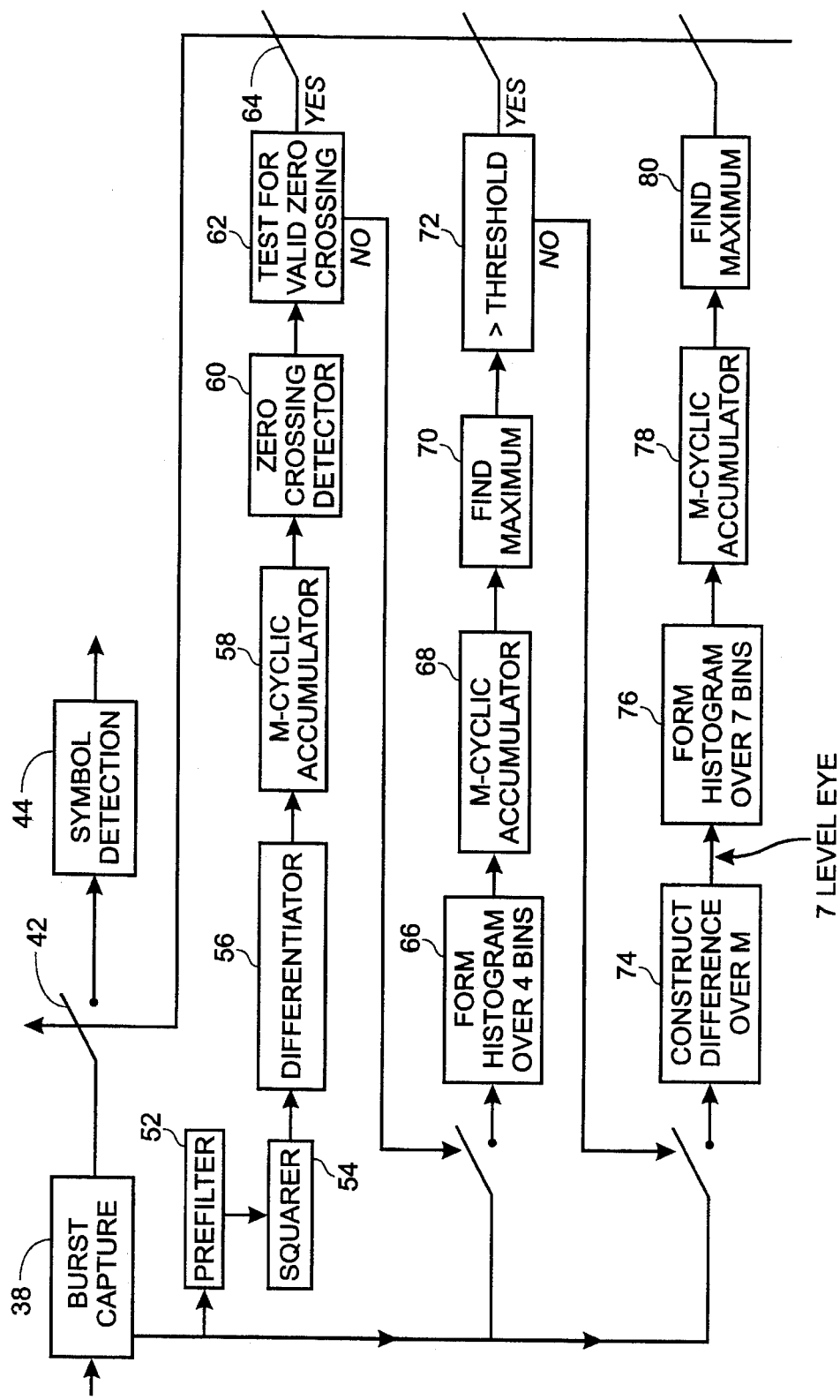
FIG. 4 is a block diagram of an apparatus, according to the present invention.

Turning now to FIG. 4, the symbol synchronization function 40 is broken down into a more detailed block diagram of functional elements. These functional elements represent three alternative methods for deriving a symbol clock to be used for data detection.

The first alternative method includes a pre-filter function 52 which filters the burst applied to it from the burst capture function 38 so as to reduce pattern jitter. A squaring function 54 removes the modulation. A differentiator 56, using the central difference method, is used to obtain the symbol clock. The differenced samples are accumulated in an M-cyclic accumulator 58 to average out the variations in corresponding samples over time. A zero crossing detector 60 identifies, from the data in the accumulator 58, a zero crossing, if possible. A test-for-a valid-zero-crossing function 62 determines whether the symbol clock obtained may to be used for detection. A valid zero crossing is indicated when the maximum valued sample in the accumulator 58 is greater than a predetermined threshold while the minimum valued sample in the accumulator is smaller than the negative of that threshold. In addition, however, the samples in the accumulator are used to invalidate an otherwise valid zero crossing that is found using this threshold method; the invalidation occurring when the samples indicate the existence of more than one zero crossing. In one embodiment, each zero crossing indicated by the samples found by (i) identifying a sign transition (positive to negative or negative to positive) between adjacent samples, e.g., first and second samples, and (ii) confirming that a sample at a predetermined point prior to the first sample has the same sign as the first sample and that a sample at a predetermined point after the second sample has the same sign as the second sample. In the case of the first and last accumulated values, this operation applies in a cyclical fashion, e.g., accumulated value 1 is considered to follow accumulated value M.

If a valid zero crossing is found and confirmed, a linear interpolation is used on the two samples on either side of the zero crossing to determine the timing for controlling operation of gate 42 for symbol detection. On the other hand, if no valid zero crossing is found using this approach, then a second alternative method is used to derive a symbol clock.

Figure 5:
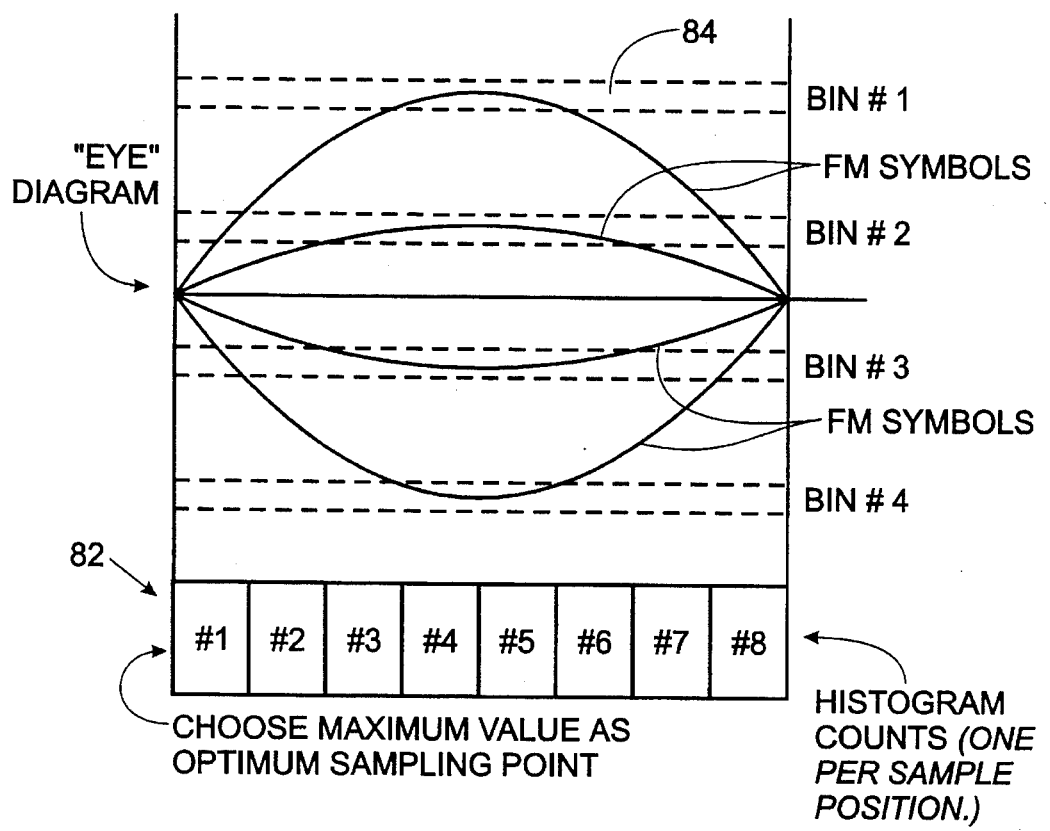
FIG. 5 is an illustration of an eye diagram of four level data symbols and the manner in which a four level histogram is constructed from burst samples, according to the present invention.

In the second alternative method, no valid zero crossing has been found using the first alternative method. Accordingly, the output of the function 62 is "NO." The "NO" output is employed to close a switch 88 initiating the circuit of the second alternative method, particularly initiating function 66. The samples from the burst are used by function 66, which provides for a predetermined number of bins 84 as shown in FIG. 5, wherein each bin corresponds to a range of values corresponding to one of the predetermined number of levels. Function 66 also provides for a histogram being formed to determine the symbol clock. In a preferred embodiment the number of bins equals the number of modulation levels. Although as shown in FIG. 5 four bins and levels are used, it is to be recognized that other numbers of each may be used without departing from the principles of the invention. It is also to be recognized that, although the bins 84 as shown are substantially centered over the corresponding modulation level, other arrangements may be used without departing from the principles of the invention. The size of the bins is dictated by the expected intersymbol interference ("ISI") obtained in the channel.

In operation, whenever a sample's value falls within one of the predetermined bins, the corresponding histogram count 82 for that sample is incremented. The histogram counts corresponding to each of the M samples are accumulated in an M-cyclic accumulator 68. The above procedure is repeated for each sample of a burst.

Using the accumulated counts, a symbol clock is found by determining whether the maximum count value in the accumulator exceeds a predetermined threshold. The maximum count value is determined in function 70. The comparison of the count against the threshold is performed in function 72. The sample number corresponding to the maximum count in the accumulator 68 represents the optimum sample point for use in detection. This sample's position, i.e., a sequential number in the M samples taken per symbol, is supplied to gate 42 for converting the burst data into symbols, as described above for the first alternative method.

Figure 6:
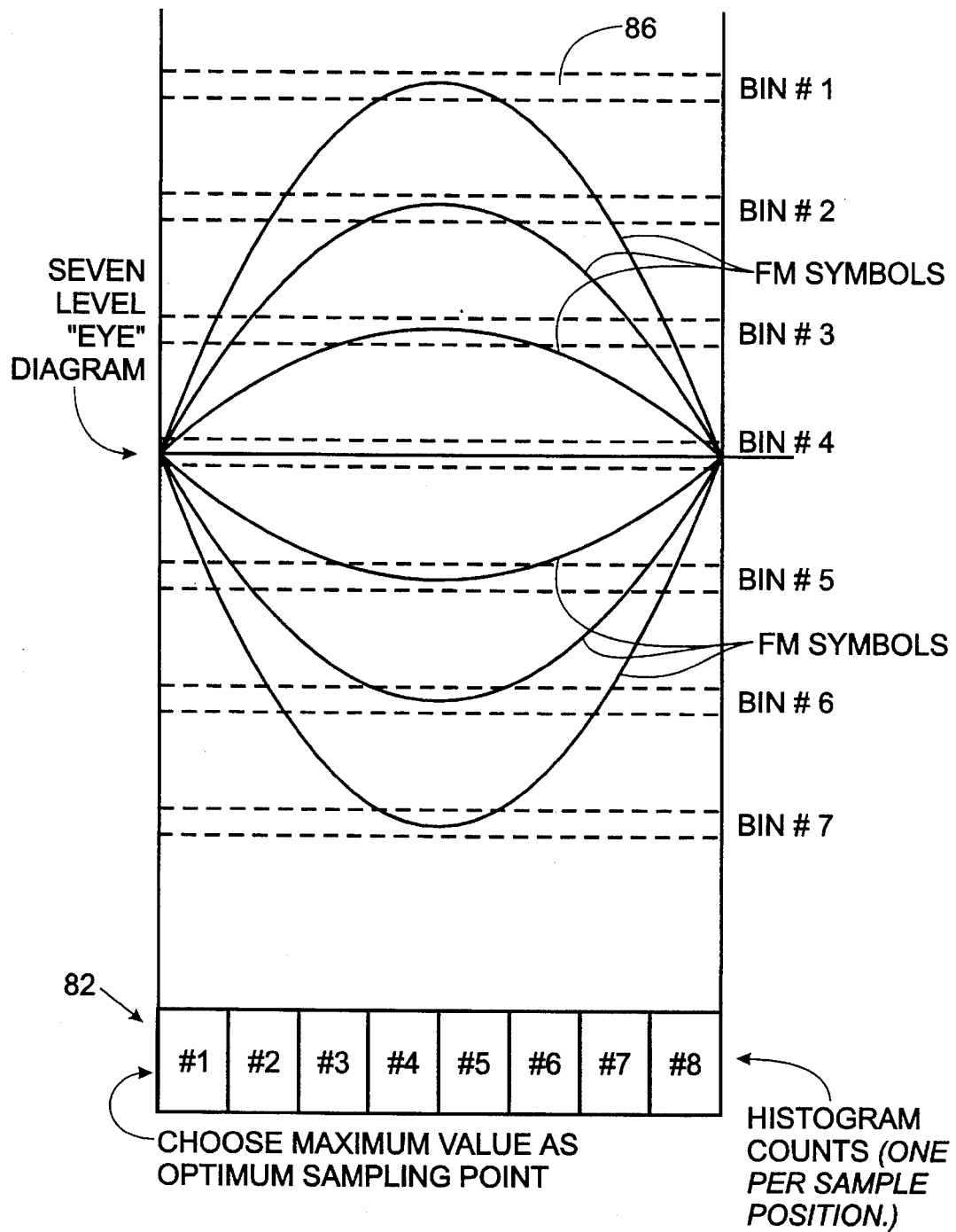
FIG. 6 is an illustration of an eye diagram of seven level data symbols and the manner in which a seven level histogram is constructed from burst samples, according to the present invention.

If no symbol clock is found in the second alternative method, a third alternative method is employed. The output of function 72 is "NO." The "NO" output is employed to close a switch 90 initiating the circuit of the third alternative method, particularly initiating a difference function 74. The difference function 74 finds differences between each pair of samples which are M samples (i.e., one symbol) apart. If the number of modulation levels is denoted as L, the difference function 74 produces a new set of samples having 2 L–1 levels. The new set of samples is applied to a second histogram function 76. The operation of this histogram function 76 is illustrated in FIG. 6. In a manner substantially the same as the histogram function used in the second alternative method described above, 2 L–1 bins are provided, wherein each bin corresponds to a range of values corresponding to one of the 2 L–1 levels and a histogram is formed in function 76 to determine the symbol clock. The histogram counts corresponding to each sample of the new set of samples are accumulated in an M-cyclic accumulator 78, and the maximum count value in the accumulator 78 is found in function 80. This maximum value corresponds to the optimum sample point for use in detection, and is supplied to the gate 42 as described above.

Although the aforementioned three alternatives have been shown together in FIG. 4, it is particularly pointed out, as is apparent therefrom and from the foregoing, that the alternative methods are employed sequentially and, therefore, may form a pipeline. Thence, while one alternative method is being employed for a particular burst, subsequent methods are not being employed for that burst yet may be performing a symbol synchronization function for a previously captured burst.

As shown in FIG. 6, an exemplary application of the third alternative method is shown in the context of four level modulation. The method results in seven levels being formed, each of which has a corresponding bin 86. Each modulation symbol corresponds to eight samples (M=8). It is to be recognized that this method may be used even though the number of samples per modulation symbol is other than the eight and the number of modulation levels is other than four, without departing from the principles of the invention.

Although the three alternative methods generally are described above as being used sequentially, it is to be recognized that any one method can be used separately of the other two methods and in other combinations with said other two methods.

While the invention has been described with reference to functional blocks and elements that may be constructed of hard wired analog and digital circuitry, most of the function blocks and elements are preferably implemented by digital signal processing in a programmed digital processor.

The terms and expressions which have been employed in the foregoing specification are employed therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A method for deriving a first symbol clock associated with a first received multilevel FM radio signal burst of symbols using samples of the burst itself, comprising the steps of:

capturing said first received multilevel FM radio signal burst to produce burst samples;

squaring said burst samples to produce squared burst samples;

differentiating said squared burst samples;

cyclically accumulating said differentiated squared burst samples to produce accumulated samples;

identifying a zero crossing in said accumulated samples; and deriving said symbol clock from said zero crossing.

2. The method of claim 1, wherein said identifying step comprises determining a sign transition between a first accumulated sample and a second accumulated sample, said first and second accumulated samples being adjacent one another.

3. The method of claim 2, wherein said identifying step further comprises confirming that a third accumulated sample at a predetermined point relative to said first accumulated sample has the same sign as said first accumulated sample, and that a fourth accumulated sample at a predetermined point relative to said second accumulated sample has the same sign as said second accumulated sample.

4. The method of claim 1, further comprising the step of testing the validity of said zero crossing so as to find a valid zero crossing.

5. The method of claim 4, wherein said testing step comprises at least one of:

(a) confirming that said accumulated samples have a maximum value thereamong that is greater than a predetermined threshold and that said accumulated samples have a minimum value thereamong that is greater than a negative of said predetermined threshold; and (b) identifying no more than one zero crossing in said accumulated samples.

6. The method of claim 1, wherein said deriving step comprises determining which of said burst samples is positioned closest to said zero crossing, and using the positioning of said determined burst sample as a symbol timing reference, said symbol timing reference being used for controlling operation of a gate associated with detecting and decoding each of said symbols represented as said burst samples.

7. A method for deriving a symbol clock associated with a first received multilevel FM radio signal burst of symbols using samples of the burst itself, comprising the steps of:

capturing said first received multilevel FM radio signal burst to produce burst samples;

forming a histogram from said burst samples, said histogram having a selected number of counter increments;

cyclically accumulating said counter increments for said first received multilevel FM radio signal burst;

determining the point in said histogram having the maximum value; and deriving said symbol clock from said point.

8. The method of claim 7, wherein said capturing step comprises capturing a selected number of said samples per symbol, and the number of counter increments corresponds to said selected number of captured samples.

9. The method of claim 8, further comprising the step of establishing a selected number of bins, each of said bins corresponding to a range of values associated with the levels of said received multilevel FM radio signal burst.

10. The method of claim 9, wherein said number of bins equals the number of the levels.

11. The method of claim 10, further comprising the step of arranging said bins relative to the levels.

12. The method of claim 9, further comprising the step of sizing said bins to accommodate expected intersymbol interference associated with said received multilevel FM radio signal burst.

13. The method of claim 9, further comprising the steps of determining the value of each of said burst samples and incrementing the respective counter increments corresponding to said burst samples when said burst samples have values falling within at least one of said bins.

14. The method of claim 7, wherein said deriving step comprises determining whether said maximum value exceeds a predetermined threshold and, if so, using the position of said burst sample corresponding to said point as a symbol timing reference, said symbol timing reference being used for controlling operation of a gate associated with detecting and decoding each of said symbols represented as said burst samples.

15. A method for deriving a symbol clock associated with a first received multilevel FM radio signal burst of symbols using samples of the burst itself, comprising the steps of:

capturing said first received multilevel FM radio signal burst to produce an original set of burst samples:

constructing a new set of samples by differencing said original set of burst samples one symbol apart:

forming a histogram from said new set of burst samples, said histogram having a selected number of counter increments;

cyclically accumulating said counter increments for said first received multilevel FM radio signal burst;

determining the point in the histogram having the maximum value: and deriving said symbol clock from said point.

16. The method of claim 15, wherein the number of counter increments corresponds to the number of samples per symbol in said new set of samples.

17. The method of claim 15, further comprising the step of establishing a selected number of bins, each of said bins corresponding to a range of values associated with a new set of levels, said new set of levels being derived by differencing the levels of said received multilevel FM radio signal burst.

18. The method of claim 17, wherein said number of bins equals the number of levels of said new set of levels.

19. The method of claim 18, further comprising the step of arranging said bins relative to the new set of levels.

20. The method of claim 17, further comprising the step of sizing said bins to accommodate expected intersymbol interference associated with said received multilevel FM radio burst.

21. The method of claim 17, further comprising the steps of determining the value of each of said burst samples and incrementing the respective counter increments corresponding to said burst samples when said burst samples have values falling within one of said bins.

22. The method of claim 15, wherein said deriving step comprises determining whether said maximum value exceeds a predetermined threshold and, if so, using the position of said burst sample that corresponds to said point as a symbol timing reference, said symbol timing reference being used for controlling operation of a gate associated with detecting and decoding each of said symbols represented as said burst samples.

* * * * *